United States Patent [19]

Agarwal et al.

[11] Patent Number: 5,066,326
[45] Date of Patent: Nov. 19, 1991

[54] GAS-FIRED STEELMELTING PROCESS

[75] Inventors: Jagdish A. Agarwal, Sudbury; Richard Gannon, Andover; Victor Goldfarb, Swampscott; David Stickler, Carlisle; Jaime Woodroffe, Andover, all of Mass.

[73] Assignee: Gas Research Institute, Chicago, Ill.

[21] Appl. No.: 519,509

[22] Filed: May 7, 1990

Related U.S. Application Data

[62] Division of Ser. No. 416,925, Oct. 4, 1989, Pat. No. 4,981,285.

[51] Int. Cl.$^5$ .............................................. C21B 13/10
[52] U.S. Cl. ......................................... 75/581; 75/958
[58] Field of Search ................... 75/581, 958; 266/201

[56] References Cited

U.S. PATENT DOCUMENTS

| | | | |
|---|---|---|---|
| 4,422,872 | 12/1983 | Geskin | 75/958 |
| 4,861,369 | 8/1989 | von Bogdandy et al. | 75/958 |
| 4,877,449 | 10/1989 | Khinkis | 266/900 |
| 4,913,734 | 4/1990 | Romenets et al. | 266/201 |

Primary Examiner—Melvyn J. Andrews
Attorney, Agent, or Firm—Perman & Green

[57] ABSTRACT

Process and apparatus for the rapid efficient melting of solid ferrous metal scrap without direct exposure to water vapor, carbon dioxide, oxygen or oxygen-containing gases, using natural gas and/or other caloric gaseous fuels. The apparatus includes a furnace having a refractory base, means for introducing ferrous metal such as solid steel scrap to the well area, means for providing a slag layer over the solid steel scrap, and gas burner means for emitting one or more forced gas flames for superheating the slag layer to a liquid which covers the scrap and for agitating and circulating the molten slag to form a highly-efficient heat-transfer medium for melting and refining the steel scrap while it is insulated against contact with gases, particularly water vapor, carbon dioxide, oxygen or oxygen-containing gases. The process may operate continuously and can recover heat for scrap preheating, turbine power and other efficient uses.

9 Claims, 3 Drawing Sheets

GAS-FIRED STEELMELTING PROCESS

This is a divisional of copending application Ser. No. 07/416,925 filed on 10-4-89, now U.S. Pat. No. 4,981,285.

BACKGROUND OF THE INVENTION

A variety of processes and furnaces are known in which ferrous metal scrap is premelted, such as in an open hearth in the presence of, or with the introduction of oxygen or oxygen-enriched air or other gases, in order to reduce the carbon content of or otherwise refine the molten metal such as steel in association with a slag.

Reference is made to U.S. Pat. No. 2,080,625 in which scrap metal is melted in a cupola or similar furnace and then flowed into one or more secondary furnaces into which tuyere members introduce burning gas jets to swirl the molten mass while desulphurizing chemicals are introduced for refining purposes Slag is blown out of the furnace.

Reference is also made to U.S. Pat. No. 3,689,250 which discloses an electric arc steelmelting furnace in which the disadvantages of arc melting, i.e., localized heating, poor heat transfer and direct exposure of the furnace walls to the radiation of the arcs, are reduced by introducing air-blown pellets radially against the surface of the slag to cause the slag to move into the area of the electric arcs in an attempt to keep the electrodes submerged. Among other disadvantages of such duplex processes is the fact that the air jets cool the slag, reduce the efficiency of the system and require further energy input.

Reference is also made to U.S. Pat. Nos. 3,603,571 and 4,021,192 which disclose furnaces which employ recovered heat for the preheating of metal scrap and for other purposes which improve the efficiency of the systems.

While the known steelmelting processes and furnaces involving the use of slag offer many advantages, they also present many disadvantages with respect to efficiency, energy recovery, loss of steel through oxidation, energy-input requirements, arc-damage to furnace walls, loss of electric power and/or other disadvantages.

Some of these disadvantages are overcome by the use of natural gas and/or other caloric gases as the heat source, and it is the objective of the present invention to provide a gas-fired melting process and apparatus for ferrous metal, such as steel, which can be run continuously for greatest efficiency, which provides efficient heat transfer to the solid metal scrap pieces by means of molten slag to cause the uniform melting of the metal while it is protected against oxidation and other undesirable reactions, and which permits recovery of heat for preheating of the scrap and/or to perform other useful functions which further increase the efficiency of the present process and apparatus.

SUMMARY OF THE INVENTION

The present invention is based upon the discovery that the gas-fired melting of ferrous metal scrap such as steel scrap can be accomplished very rapidly and very efficiently, with a degree of refining or impurity-extraction and a low metal loss through oxidation and other undesirable reactions, by insulating the solid steel scrap beneath a continuous layer of molten slag, and directing one or more forced gas jet flames against and/or below the upper surface of the molten slag layer in order to impart convective motion thereto to heat the slag layer and create a vertical and/or horizontal circulation of the superheated slag layer over the steel scrap in order to transfer the heat of the gas jet flames to the scrap metal substantially uniformly, indirectly, and much more rapidly and efficiently than possible by means of conduction alone, to accomplish the rapid melting thereof without exposure of the molten scrap metal to water vapor, carbon dioxide oxygen, air or other reaction-producing gases present in the furnace atmosphere.

The forced gas jet flames perform the dual function of heating the molten slag and causing it to circulate at a relatively high flow velocity in desired directions to maintain a substantially-uniform desired slag temperature for the rapid melting of the ferrous metal scrap. The high flow velocity of the slag increases the rate of heat transfer by a factor of more than about five times as compared to heat transfer by means of conduction alone. A factor of about ten to thirty or more times is readily achievable.

The chemically-controlled molten slag also performs multiple functions by acting as a circulating heat-transfer liquid in contact with the solid scrap and molten metal on which it is supported, to produce heat exchange by convection and conduction means for the most efficient inert melting of the scrap, and by introducing active chemicals and extracting undesirable pollutants and impurities to produce refining during the melting of the scrap metal, and by insulating the scrap metal against direct contact with the gas jet flames and/or against contact with reactive gases present in the furnace atmosphere during the melting process to prevent oxidation and other reactions which reduce the yield of the molten metal.

Preferably, embodiments of the present process and apparatus can include means for using a substantial portion of the "waste" heat generated during the melting step for purposes of (a) pre-heating the solid scrap metal to an elevated, non-melting temperature prior to its introduction in solid, heated condition below the slag layer; (b) creating steam to drive turbines such as for powering a compressor of an oxygen-producing system for supplying oxygen to the gas burners, or generating additional electrical power which can be used to superheat the steel in an intermediate holding vessel, and to keep the steel hot in a final treatment ladle, and for other useful purposes including the pre-processing step of removing non-magnetic material from the steel scrap.

The present invention permits tailoring of the chemical composition of the conventional molten salt or slag, such as by adding and regulating the concentration of chemicals such as lime, carbon, silica and other known slag additives, for desulphurization and removal of other undesired impurities. The slag can be chemically-neutral, chemically-basic or chemically-acidic. In the latter case the slag contains silica, and an inexpensive refractory liner can be used in the furnace melting chamber. Slag is added and removed periodically during the continuous operation of the present process and apparatus, in order to maintain the desired layer thickness, viscosity and composition of the slag layer. The viscosity of the slag layer is regulated, as necessary, so that it is sufficiently viscous to resist being spattered excessively by the force of the gas jets, causing exposure of the molten layer, and is not so viscous as to resist good circulation under the force of the gas jets. If the process and apparatus are operated batchwise, i.e., with brief interruptions for feeding new solid scrap and for tapping molten steel, slag is added and removed periodically in order to maintain the necessary thickness of the slag layer. In the continuous mode of operation, the scrap feeding and molten steel-tapping are regulated to maintain an optimum thickness ratio of molten steel to slag layer.

DETAILED DESCRIPTION OF THE INVENTION

Figure 1:
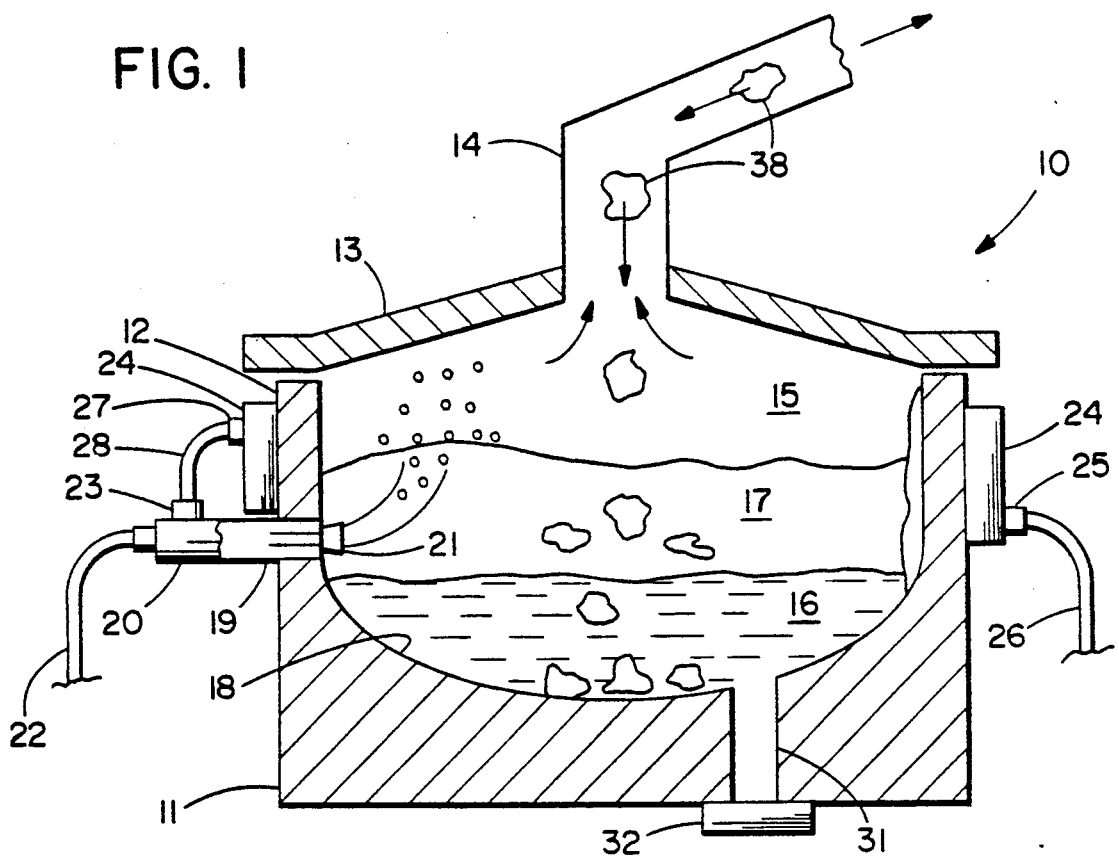
FIG. 1 illustrates a sectional view of a conceptual apparatus according to one embodiment of the present invention.
Figure 2:
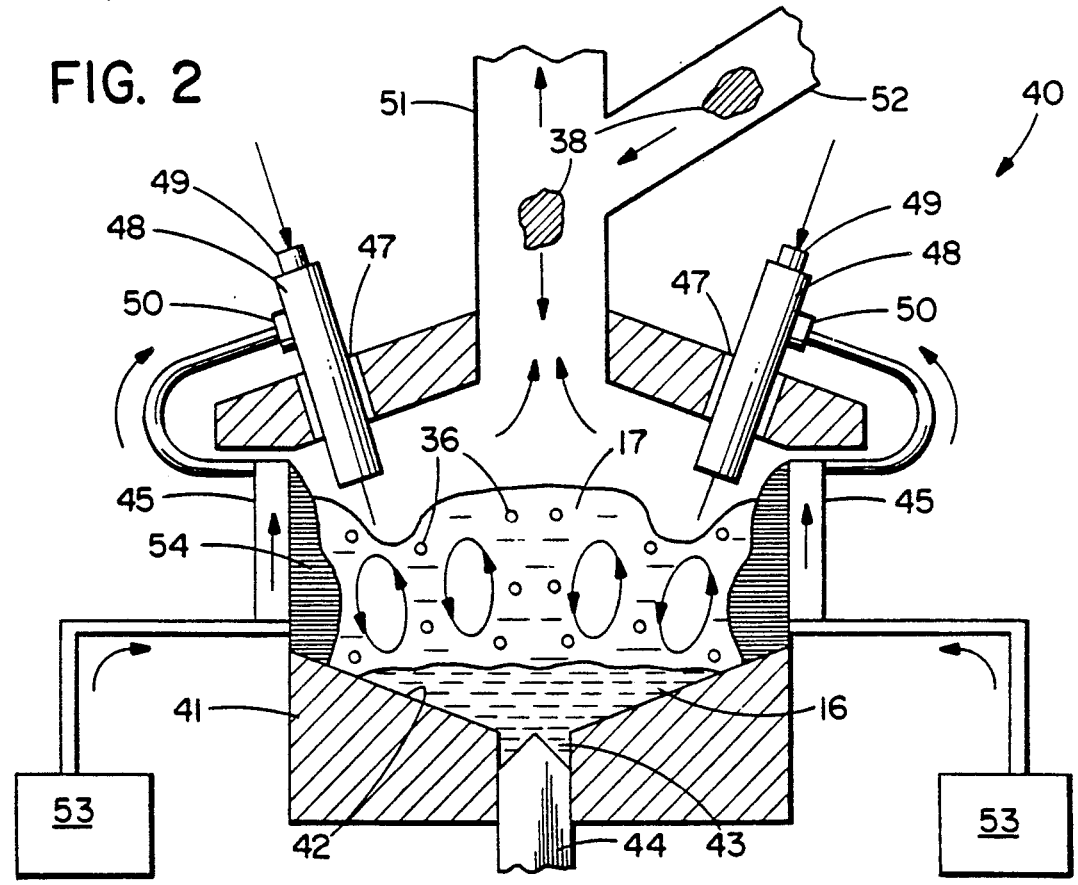
FIG. 2 illustrates a sectional view of another conceptual apparatus of the present invention.
Figure 3:
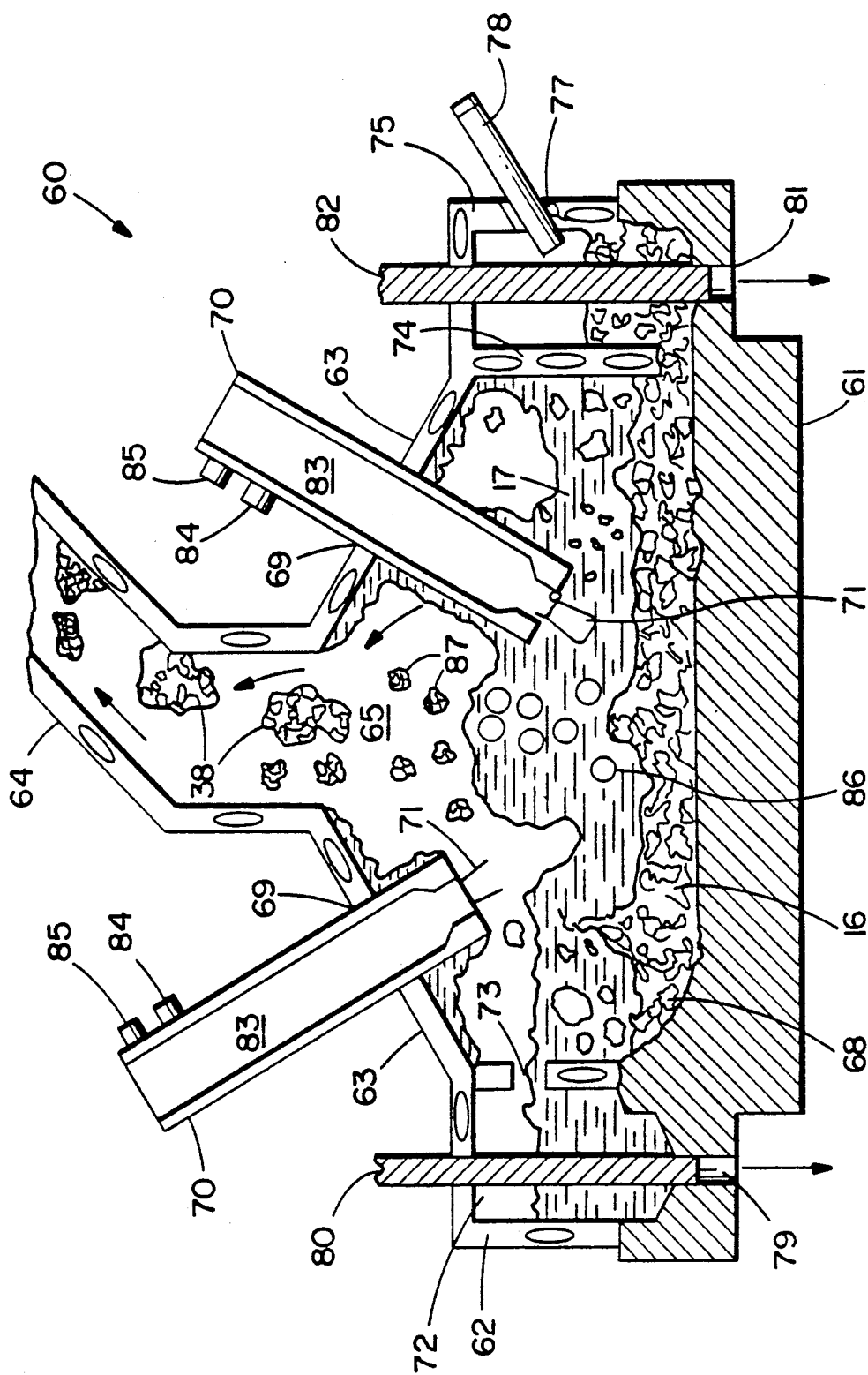
FIG. 3 illustrates a sectional view of a more specific apparatus according to the present invention.

The novel apparatus embodiments of the present invention, as illustrated by the gas-fired steelmaking furnaces 10, 40 and 60 of FIGS. 1 to 3 of the accompanying drawings, are designed for efficient operation as integral components of a cost-efficient, energy-efficient, low-pollutant system for melting ferrous scrap metal with a minimum loss through oxidation and other iron reactions, preferably while extracting sulphur and other undesired impurities and reducing nitrogen-oxygen pollutants of the waste gases fed through the scrubber to the stack for safe discharge into the atmosphere.

The furnace 10 illustrated by FIG. 1 has a refractory bottom 11 and an upper enclosure wall 12 which is cooled in conventional manner and which extends up into a conical roof portion 13 opening into a central scrap-feeding conduit 14 through which hot waste gases exhaust to a scrap preheating station, and down which the preheated solid scrap metal pieces 38 are gravity fed for introduction to the furnace melting chamber 15 and eventual submersion in the molten metal pool 16, beneath the surface of a continuous layer 17 of superheated slag, within the rounded interior well 18 of the refractory bottom 11 of the furnace. The furnace wall 12 preferably is cylindrical and has at least one intermediate opening 19 extending therethrough, which supports a gas burner housing 20 for extension at an angle into the slag layer 17 to exert the force of the burning gas jet 21 against the molten slag layer 17, for purposes of superheating the slag layer 17 and imparting thereto a horizontal or swirling flow velocity or circulation, as assisted by the cylindrical shape of the melting chamber 15. A plurality of uniformly spaced openings 19 and gas burner housings 20 preferably are present, each gas jet flow preferably being near sonic gas flow conditions.

Each gas burner housing has a caloric gas inlet 22 connected to a source of fuel gas such as natural gas or another caloric gas, and an oxidizer gas inlet 23 connected to a source of an oxidizer gas such as oxygen. The gas burner(s) includes means for mixing the gases to form a flammable mixture which is ignited as a burning gas jet 21 emitted from the burner at a relatively high force. The burning gas jet(s) enter the slag layer 17 tangentially relative to the vertical axis of the furnace to impart a horizontal or swirling flow, caused by the angular impingement or inclination of the housing(s) 20 and the round shape of the furnace wall 12.

In the illustrated embodiment of FIG. 1, a portion of the outer surface of the furnace wall 12 includes a surrounding jacket 24 including an interior coil which communicates with the wall 12 and which has an inlet 25 for receiving a supply of oxidizer gas from a source conduit 26, and an outlet 27 connected by a conduit 28 to the oxidizer inlet 23 of the gas burner housing(s) 20. This embodiment serves to pre-heat the oxidizer gas, such as oxygen or air, to convey more calories to the burner jet(s) 21, while assisting to extract heat from the furnace wall 12 to cause cooling thereof, in the case of smaller furnaces. In all cases the furnace wall is cooled in conventional manner, such as by the circulation of a heat-transfer fluid through cooling passages in the furnace wall.

The furnace 10 is also provided with a drain 31 having a tapping mechanism 32 for releasing molten steel for subsequent refinement and/or use.

The furnace 40 of FIG. 2 represents an alternative conceptual design in which the cylindrical furnace has a ceramic bottom 41 having a conical inner well 42 with a central drain 43 and a stop member 44 for discharging the molten metal, an oxygen-cooled cylindrical side wall 45 and a ceramic cover or roof portion 46 having a plurality of uniformly-spaced openings 47, each supporting a gas burner housing 48 similar to housings 20 described in connection with FIG. 1, each having a gas inlet 49, such as for natural gas, and an oxidizing gas inlet 50. The gas burners within the housings 48 are supported to direct burning gas jets downwardly and tangentially around the center of the slag layer 17 to create vertical circulation loops in the slag, as illustrated, while causing horizontal or swirling circulation of the slag layer in the clockwise or counter-clockwise direction, depending upon the tangential direction of the burners. This causes relatively uniform superheating of the slag layer for uniform exchange of the heat from the burners to the molten metal pool 16, which is also caused to swirl. Combustion products including water vapors and carbon dioxide, carrying a significant amount of sensible heat, are released upwardly into the central exhaust conduit 51 through which solid preheated scrap particles 38 are fed by means of a side conduit 52 communicating with a scrap preheating station.

The exhaust conduit 51 and/or the side conduit 52 can communicate with preheaters for the solid scrap and/or for the oxygen supply to the burners, or with other heat- or steam-recovery systems which utilize the normally-lost heat and/or steam and which thereby reduce the temperature to the stack and reduce the amount of lost energy. For example, the exhaust conduit 51 can comprise a water jacket through which cold water is circulated to extract heat from the conduit 51 and produce steam for related or unrelated power-generation purposes.

In the embodiment of FIG. 2, the cylindrical side walls 45, which are water-cooled in conventional manner, contain a network which receives oxygen gas or oxygen-enriched air from an oxygen supply 53 for circulation around the side walls 45 for purposes of preheating said oxygen gas or air prior to its introduction through inlets 50 into the gas burners within the housings 48 for admixture with the natural gas. This introduces more heat into the furnace during the combustion of the gas mixture.

The conventional cooling of the furnace walls 45 causes the slag layer to form a highly viscous o solid slag layer 54 around the inner periphery of the walls 45 to insulate the walls 45 and reduce erosion thereof.

As with the furnace 10 of FIG. 1, furnace 40 can be operated in batch mode or in continuous mode. In all cases a heel or substantial residue of molten metal is retained within the inner well 42 of the refractory bottom 41.

The furnace 60 of FIG. 3 has a slag-receiving chamber 72 at one side thereof which admits surface portions of the slag layer 17 through an upper opening 73 in the interior wall 74 of the furnace, and a molten metal-receiving chamber 75, which receives molten metal through a lower opening 76 in the interior wall 74 of the furnace. The molten metal chamber 75 preferably includes an outer wall opening 77 which receives an auxiliary heater 78 for maintaining the metal molten in the chamber 75 in cases where the furnace is not operated in continuous mode. In such cases, i.e., where intermittent batches of scrap are being melted, the slag port 79 or drain of the slag chamber 72, through the refractory bottom 61, is closed by a slag stopper 80, and the molten metal port 81 or drain in the metal chamber 75, through the refractory bottom 61, is closed by a molten metal stopper 82. During the continuous mode of operation, where scrap and is being continuously fed to the furnace in predetermined relative proportions, the slag stopper 80 is withdrawn to permit slag to be drained intermittently to remove scum from the slag layer surface, and the metal stopper 82 is withdrawn to permit molten metal to be drained continuously into a heated ladle or into a ladle metallurgy station for further refining or for composition control before casting in a continuous cluster. New slag ingredients are added through a roof inlet, not shown in FIG. 3, to maintain the chemical composition, viscosity and depth of the slag layer, as may be necessary.

The burner housings 70 of FIG. 3 support burners 83 which are shown in different extension positions for illustration only, and will all be in the same retracted or submerged positions during use. The burners 83 receive and mix natural gas or other caloric gas, through inlet 84, and an oxidizer gas such as oxygen, through inlet 85, under sufficient pressure to emit burning gas jets 71 which either exit beneath or impinge upon and penetrate and agitate the surface of the slag layer, outwardly or tangentially of the center thereof, and create a continuous movement or circulation of the slag layer at a predetermined slag flow velocity. This causes the slag layer to circulate in a vertically-inclined direction, due to the inclined downward force of the gas jets, and to swirl horizontally, due to the non-radial or tangential attitude of the jets relative to the slag layer, so that the slag layer is efficiently superheated by continuous movement through the areas of the melting chamber 65 which are most directly affected by the plurality of gas jets 71. The thickness of the slag layer varies depending upon the size of the furnace. Generally the slag layer is maintained sufficiently thick to prevent exposure of the metal layer under the force of the gas jets and sufficiently thin to provide good circulation and more uniform temperature. A slag layer thickness of about three to five inches produces excellent results.

Figure 4:
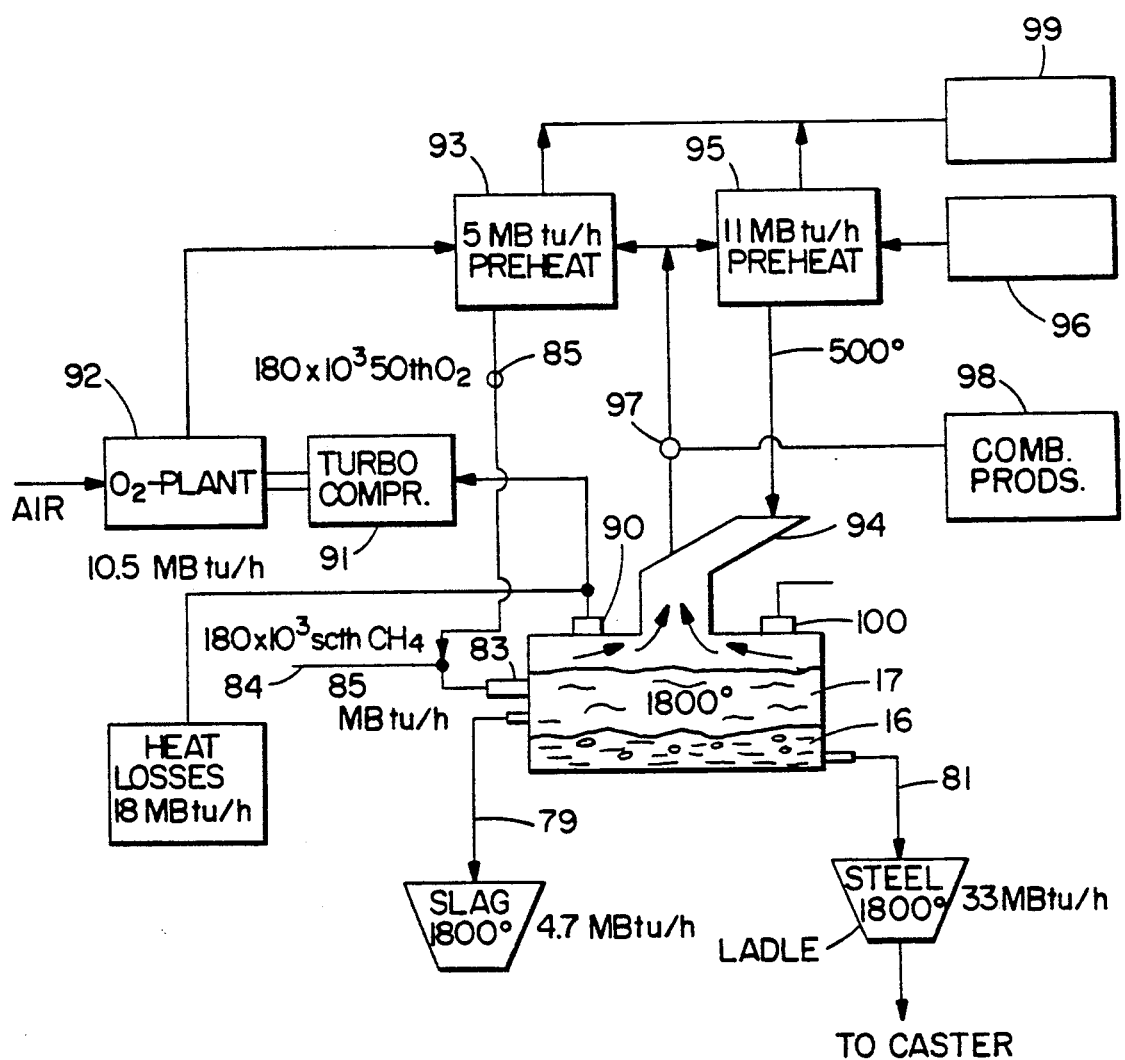
FIG. 4 illustrates a flow diagram representative of the operation of an embodiment of the present process and apparatus.

To reduce direct interaction between the steam and/or gas bubbles 86, created by the gas jets in the slag layer 17, and the molten metal pool 16, the gas burners 83 are located around the circumference of the roof portion 63 of the furnace, above the circumference of the refractory bottom 61, and are inclined tangentially towards but outwardly of the center areas of the slag layer 17 to cause the metal pool 16 and slag layer 17 to swirl clockwise or counter-clockwise around the cylindrical well 68 of the refractory bottom 61. Each jet 71 serves or affects an area of the slag layer 17 having a diameter about equal to the depth of the layer. Some of the generated gases react with an/or remain trapped within the slag layer, such as some of the nitrogen-oxygen pollutants, thereby reducing the discharge of pollutants to the scrubber and to the stack. Some of the pollutants are also trapped and/or deposited on the solid metal scrap in the preheating station and are carried back into the furnace with the scrap pieces 38 for re-entry into the slag layer. Some of the pollutants are removed from the furnaces, within the slag layer portions which are discharged through the slag chamber 72 and drain port 79. Formation of nitrogen oxides is also greatly reduced due to the low nitrogen content of the furnace gas FIG. 4 illustrates the operation of an apparatus according to an embodiment of the present invention, similar reference numbers being used in FIGS. 3 and 4 to identify similar elements. In the efficient system of FIG. 4, combustion products including water vapors and carbon dioxide carrying significant amounts of sensible heat are extracted from the furnace through roof outlet 90 and are conveyed by a conduit to steam generation unit 90a, which steam is used to power a compressor turbine 91 to power an oxygen-producing plant 92 and to circulate the oxygen, and air admitted thereto, through a preheater 93, in which the oxidizer mixture is heated to about 600° C., to the oxygen inlet 85 of the burners. The oxygen plant 92 may also be associated with the wall of the furnace for purposes of feeding heated oxygen to the preheater 93 or 95, as described in connection with the embodiment of FIG. 2. As shown in FIG. 4, the preheater 93 uses heat extracted from the scrap-feeding conduit through outlet conduit 94, the remainder of the heat from outlet 94 being fed to the scrap metal preheater 95. Preheater 95 receives a continuous or dosed supply of scrap metal pieces, such as up to 50 cm in cross-section, at a rate of about 60 to 80 kg loads every 10seconds, from a scrap supply station 96, depending upon the size of the furnace.

The scrap metal pieces are heated to a temperature below their melting point, i.e., about 500° C. and are fed by gravity means down through the scrap conduit 94 into the slag layer 17 and metal pool 16. The preheating of the metal scrap pieces and of the oxygen/air mixture reduces the temperature of the waste heat fed to the stack 99. If desired, intermediate heat-recovery devices may be employed upstream of the stack to further reduce the stack temperature and to use the normally-lost heat for related purposes.

As further illustrated by FIG. 4, excess combustion product gases can be extracted at an intermediate location 97 from the superheated gases (1800° C.) fed from the waste conduit outlet 94 to the preheaters 93 and 95 and fed to a work station 98 such as a turbine for the generation of electricity for related or non-related purposes, such as to power a supplemental electric arc burner within the furnace to enhance the generation of higher temperatures, and enthalpy, thereby enhancing the heat exchange between the gases in the furnace and the liquid slag layer.

FIG. 4 also illustrates the slag inlet conduit 100 in the roof of the furnace through which fresh slag composition is introduced to the furnace to replace used slag which is withdrawn and/or to introduce slag chemicals which are consumed in the refining processes, such as desulphurization.

While FIGS. 2 and 3 of the present drawings illustrate preferred embodiments in which the gas burner tuyeres are fixed or supported for retractable extension through openings in the roof portion of the furnace wall, FIG. 1 also illustrates that they can be supported for extension through openings in the cylindrical side wall of the furnace. The gas burners in the side wall and/or roof portion of the furnace wall preferably are supported for adjustable extension into the furnace so that they can be fixed in positions above or below the upper surface of the slag layer, as desired. and can accommodate metal pools and slag layers of different depths.

It will be apparent to those skilled in the art that the present furnace system enables full utilization of natural gas or other caloric gases and mixtures thereof with oxygen or oxygen-enriched air for the melting of ferrous scrap metals such as steel, with recovery of a substantial portion of the normally-lost heat and/or steam for purposes related to the economy of the system. The present gas-fed furnaces permit an overall process material or scrap loading which is lower than that of an electric arc furnace having the same throughput, and therefore the size of the furnace and the residence time of the metal being melted therein are also smaller. This substantially reduces the cost of the furnace, and the space required for its accommodation while substantially increasing its efficiency.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

We claim:

1. A slagmelt process for melting solid ferrous metal scrap in a slagmelt furnace to produce low carbon-content steel and for insulating said scrap against contact with oxidizing gases during the melting thereof, comprising the steps of:
   (a) providing a continuous layer consisting essentially of a chemically-controlled slag composition in a slagmelt furnace;
   (b) superheating said layer of slag composition to molten condition by introducing against and/or beneath the surface thereof one or more jets consisting essentially of an ignited mixture of a fuel gas and an oxidizer gas, the temperature, direction and velocity of said jets heating and circulating said slag layer to a substantially uniform temperature above the melting temperature of said ferrous metal scrap; and
   (c) immersing a supply of pieces of said solid ferrous metal scrap beneath the surface of said layer of molten slag composition to melt said scrap pieces by heat conducted and convected from said layer of molten slag composition while the scrap pieces are insulated by the layer of slag composition against oxidation and other undesirable reactions, and against exposure to carbon dioxide, water vapor, oxygen, air or other gases present in the atmosphere above said slag layer during the melting of said solid ferrous metal scrap pieces, to form a molten layer of low carbon-content ferrous metal beneath said superheated layer of slag composition.

2. A process according to claim 1 which comprises directing excess thermal energy of the combustion gases released by the superheated slag to a preheating station to preheat said pieces of scrap, and gravity-feeding the preheated scrap pieces down into the layer of slag.

3. A process according to claim 1 in which the layer of slag is heated by impinging the gas fired jets against the upper surface of the slag layer, tangentially of the central vertical axis of the slag layer to impart a vertically-inclined circulation to the slag while also causing the slag to flow horizontally in a swirling motion around the central axis thereof, whereby heat transfer from the slag layer to the solid pieces of ferrous metal is increased by a factor of at least about five or more times as compared to conduction alone.

4. A process according to claim 3 in which the layer of slag is heated by submerging the gas fired jets below the upper surface of the slag layer.

5. A process according to claim 1 which comprises adding ferrous metal-refining materials to the layer of slag.

6. A continuous process according to claim 1 in which a continuous supply of preheated solid steel scrap pieces are immersed in the superheated layer of slag, a continuous supply of molten steel is drained directly from said molten steel layer, and slag ingredients are added and slag is withdrawn periodically to maintain the chemical composition, viscosity and/or thickness of the slag layer.

7. A process according to claim 1 which comprises directing excess thermal energy of the combustion gases to a preheating station for the preheating of an oxidizer gas, and directing said preheated gas to said gas-fired jets.

8. A process according to claim 1 in which a molten layer of ferrous metal and the superheated slag layer are present within a refractory furnace having a side wall, comprising cooling said side wall to cool and/or solidify the portion of the slag layer in contact therewith, thereby reducing erosion of the interior surface of said side wall.

9. A process according to claim 8 which comprises at least partially cooling said side wall of the furnace by means of the circulation of an oxidizer gas therewithin.

* * * * *